No. 757,538. PATENTED APR. 19, 1904.
C. A. ANDERSON.
MITER BOX.
APPLICATION FILED MAR. 7, 1903.
NO MODEL.
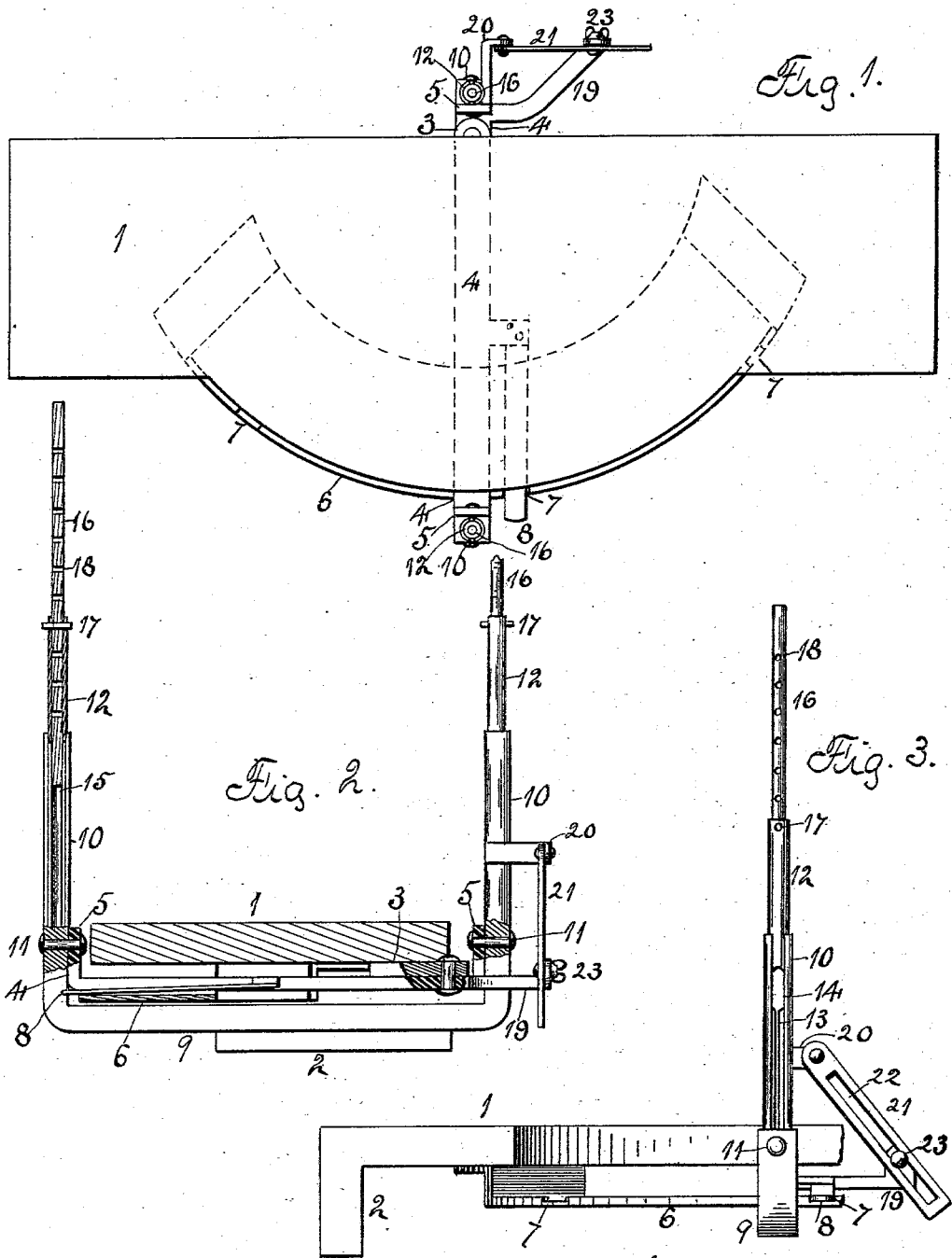
Witnesses:
E. Behel
Wm E Griggs
Inventor:
Charles A. Anderson
By A. O. Behel
Atty.

No. 757,538. Patented April 19, 1904.

UNITED STATES PATENT OFFICE.

CHARLES A. ANDERSON, OF ROCKFORD, ILLINOIS.

MITER-BOX.

SPECIFICATION forming part of Letters Patent No. 757,538, dated April 19, 1904.

Application filed March 7, 1903. Serial No. 146,781. (No model.)

*To all whom it may concern:*

Be it known that I, CHARLES A. ANDERSON, a citizen of the United States, residing at Rockford, in the county of Winnebago and State of Illinois, have invented certain new and useful Improvements in Miter-Boxes, of which the following is a specification.

The object of this invention is to construct a miter-box in which the saw-guides can be turned so that the saw can produce an undercut.

In the accompanying drawings, Figure 1 is a plan view of my improved miter-box. Fig. 2 is a transverse central section. Fig. 3 is a partial elevation.

The platform 1 has feet 2 supporting it. A plate 3 is secured to the under face of the platform and has a rearward extension, to which is pivoted a horizontal bar 4, having its ends 5 turned up and each end provided with an opening. A segmental plate 6 is secured to the under face of the platform and has its outer edge provided with notches 7. A spring-plate 8 has a connection with the bar 4 and movable therewith and capable of entering the notches 7 in the segmental plate, thereby forming a connection between the bar 4 and platform.

The saw-guide comprises a horizontal bar 9 and two uprights 10, one at each end of the bar. These uprights have a pivotal connection with the upturned ends 5 of the bar 4 by the rivets 11, which permit the saw-guides to stand at an angle oblique to the platform.

Within each upright 10 is located a movable saw-guide 12, having a lengthwise slot 13 and an opening 14 for the saw-back. A cylindrical opening 15 is formed in each saw-guide, and within the opening is located a lengthwise-movable stop 16, held in its adjusted position by a pin 17, passing through the upper end of the saw-guide and one of the holes 18 in the shank portion of the stop.

From the bar 4 extends an arm 19, and from the rear saw-guide support 10 extends an arm 20, to which is pivoted a link 21, having a lengthwise slot 22, within which is located a clamping-bolt 23, serving to connect the link with the arm 19. By means of this adjustment the saw-guides 10 are moved on their pivotal connection with the bar 4 and held in any adjustment.

If a saw is employed having a thick back, the back is located in the openings in the saw-guides and the guides can be raised in their supports to allow the material to be cut to be placed on the platform.

If a thin-back saw is used, the strips 16 are adjusted in the lengthwise direction of the saw-guides to meet the requirements of the width of the saw.

By liberating the spring-bar from the notches in the segmental plate the bar supporting the saw-guide supports can be turned so that the saw can be set at different angles, and as the adjustment for producing the oblique cuts is carried by the bar 4 a combination of cuts can be had.

By having the stops 16 vertically adjustable in the saw-guides saws of different widths can be used.

I claim as my invention—

1. A miter-box comprising a platform, a bar located beneath the platform having upturned ends and having a pivotal connection with the platform, a saw-guide located beneath the bar having uprights pivotally connected to the upturned ends, movable saw-guides located in the uprights, a curved notched plate and a spring-plate connected to the bar and adapted to enter the notches.

2. A miter-box comprising a platform, a bar located beneath the platform having upturned ends and having a pivotal connection with the platform, a saw-guide located beneath the bar having uprights pivotally connected to the upturned ends, movable saw-guides located in the uprights, a curved notched plate, a spring-plate connected to the bar and adapted to enter the notches, an arm extending from the bar and a slotted link forming a connection between the arm and one of the uprights.

CHARLES A. ANDERSON.

Witnesses:
A. O. BEHEL,
E. BEHEL.